United States Patent
Kasprzak et al.

(10) Patent No.: US 7,224,154 B2
(45) Date of Patent: May 29, 2007

(54) SYSTEM AND METHOD FOR ADJUSTING THE CURRENT LIMIT OF A POWER SUPPLY

(75) Inventors: Keith J. Kasprzak, Cedar Park, TX (US); Ali S. Ba-Thunya, Round Rock, TX (US); Lynn E. Simmons, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 10/825,808

(22) Filed: Apr. 16, 2004

(65) Prior Publication Data

US 2005/0231986 A1  Oct. 20, 2005

(51) Int. Cl.
*G05F 5/00* (2006.01)
(52) U.S. Cl. .................. 323/299; 323/908
(58) Field of Classification Search ........ 323/299, 323/300, 908; 363/78, 84, 95
See application file for complete search history.

(56) References Cited

U.S. PATENT DOCUMENTS

| 5,559,660 | A | * | 9/1996 | Watson et al. ............... 361/58 |
| 5,783,933 | A | * | 7/1998 | Bailly ........................ 323/282 |
| 6,343,026 | B1 | * | 1/2002 | Perry ........................... 363/65 |
| 6,359,410 | B1 |   | 3/2002 | Randolph .................... 318/599 |
| 6,437,981 | B1 |   | 8/2002 | Newton et al. .............. 361/700 |
| 6,714,429 | B2 | * | 3/2004 | Phadke ........................ 363/89 |
| 6,735,064 | B2 | * | 5/2004 | Miyazaki .................... 361/58 |
| 6,781,357 | B2 | * | 8/2004 | Balakrishnan et al. ...... 323/282 |
| 6,862,201 | B2 | * | 3/2005 | Hodge, Jr. ................... 363/89 |
| 6,972,969 | B1 | * | 12/2005 | Shteynberg et al. ..... 363/21.12 |

* cited by examiner

*Primary Examiner*—Jeffrey Sterrett
(74) *Attorney, Agent, or Firm*—Baker Botts L.L.P.

(57) ABSTRACT

A system and method is providing for adjusting the current limit of a power supply. The current limit is set at a level that corresponds to the maximum flow of amperage that is within the bounds of the power characteristics of the input line to the power supply.

12 Claims, 2 Drawing Sheets

SYSTEM AND METHOD FOR ADJUSTING THE CURRENT LIMIT OF A POWER SUPPLY

TECHNICAL FIELD

The present disclosure relates generally to the field of computer or information systems, and, more particularly, a system and method for adjusting the current limit of the output of a power supply.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system, including any computer system, typically includes a power supply. A power supply converts input power into one or more voltage potentials for use by components of the information handling system. The power demands or requirements of information handling systems are increasing, especially in the case of some modern server computers. As a result, some server computer systems have a potential power demand that is greater than safety limits imposed on input power that can be delivered to the input of the power supply of the computer system. As an example, assume that a server computer requires 1550 watts of power and that the server computer is coupled to a 100 volt A/C line with a 15 amp circuit breaker, as is typical in some input voltage configurations in Japan. The server computer may include a power supply with a 78% efficiency rating and a power factor of 97%. In this example, the maximum power deliverable by the power supply of the server computer is 1135 watts (100 v A/C×15 A=1500 W input power; 1500 W input power×0.78 power supply efficiency×0.97 power factor). As can be seen from this example, the output power of a power supply is limited by the voltage and amperage of the input line. The voltage and amperage of the input line may vary by country. In addition, some countries or standards bodies limit the amperage of circuit breakers, further limiting the input power delivered to a power of an information handling system.

As a technique for increasing the input power available to an information handling system, the power supply and its associated information handling system could configured to draw power from a high line input (180–264 VAC). An information handling system could also operate on the basis of three phase power, thereby increasing the amount of input power available to the power supply of the information handling system. Both of these alternatives, however, increase the cost and complexity of the information handling system, and render the system less flexible, and therefore less marketable, in terms of the ability of the system to operate with more common sources of input power. As another option for equating the power demands of the system with the input power available to the system, the power demand of the computer system could be limiting by selectively throttling the components of the computer system. The selective throttling of the system is not advantageous, however, as this reduces the performance or output of the system.

SUMMARY

In accordance with the present disclosure, a system and method is disclosed for adjusting the current limit of the output of a power supply. The current limit is set at a level that corresponds to the maximum flow of amperage that is within the bounds of the power characteristics of the input line to the power supply. When the input line to the power supply is a lower voltage level line, the current limit at the output of the power supply is set to a lower limit so as to be within the safety margins established at the input of the power supply. A technical advantage of the present disclosure is a current control system that is dynamic and dependent on the voltage level of the input line of the power supply. If the input line of the power supply is sufficiently high, the current limit at the output of the power supply can likewise be set at a maximum level, thereby putting a high or no limit on the current that can be drawn by the components of the information handling system. Another technical advantage of the system and method disclosed herein is a current adjustment mechanism that allows a single design of power supply to be used in multiple regions that might have different characteristics of input line voltage. The output current limit of the power supply is adjusted to meet the voltage characteristic of the input line. The system and method disclosed herein is also advantageous in that it is inexpensive and can be easily integrated into the design of a power supply. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. An information handling system will typically include a power supply, which functions to convert input power into one or more voltage potentials for use by other components of the information handling system.

Figure 1:
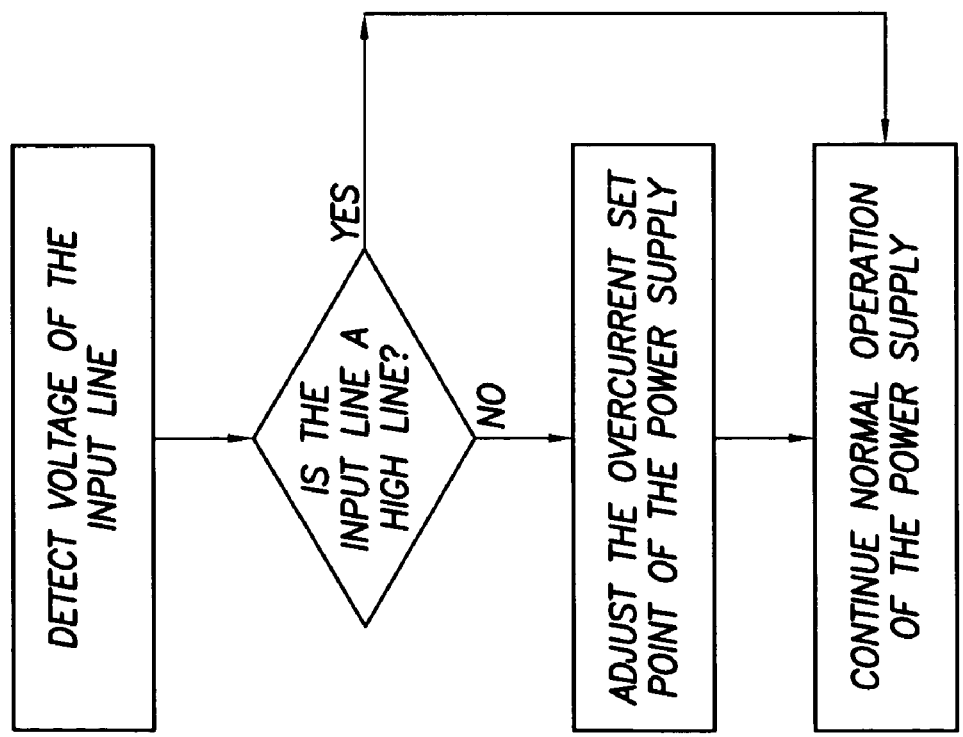
FIG. 1 is a flow diagram of a method for evaluating the voltage level of an input line and adjusting the current limit of the output of a power supply.

The system and method disclosed herein involve the monitoring of the input voltage to the power supply. In response to a sensing of the input line voltage, the overcurrent set point of the power supply is adjusted to reflect the voltage of, and the potential power provided by, the input line to the power supply. Shown in FIG. 1 are a series of method steps involved in evaluating the voltage input to the power supply and adjusting the operation of the power supply in response. At step 10, the voltage of the input line is detected. Following the determination of the input line of the voltage level, it is determined at step 12 whether the input line is sufficiently high that it can be characterized as a high line (180–264 VAC). If the input line is a high line, no adjustment is made to the operation of the power supply, and the normal operation of the power supply is allowed to continued, as indicated at step 16. If the input line is not a high line, the overcurrent set point is adjusted at step 14 to reflect and compensate for the input voltage level. Following the adjustment of the overcurrent set point at step 14, normal operation of the power supply continues at step 16.

Figure 2:
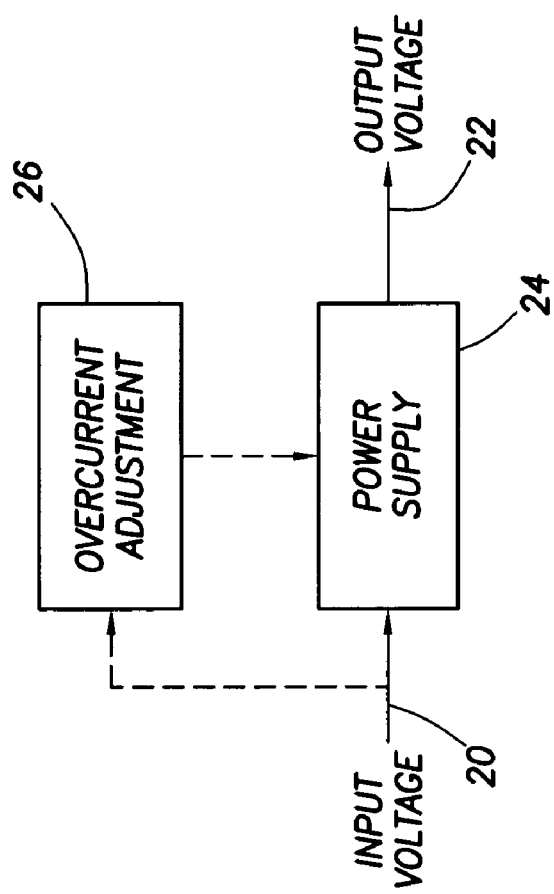
FIG. 2 is a diagram of the logical relationship between the input voltage, output voltage, power supply, and an overcurrent adjustment module.

Shown in FIG. 2 is a diagram of the logical relationship between the input voltage, output voltage, power supply, and an overcurrent adjustment module. Power supply 24 receives an input voltage or line voltage 20 and provides as an output an output voltage 22. An overcurrent adjustment module is shown at 26. Dotted lines are shown as paths of communicative data between overcurrent adjustment module 26 and input voltage 20 and power supply 24. Overcurrent adjustment module 26 reads the input voltage level and provides a signal to power supply 24 that results in the adjustment of the overcurrent set point in power supply 24. It should be recognized that overcurrent adjustment module 26 may be implemented as a physical element of power supply 24. Overcurrent adjustment module 26 is shown as a separate module in FIG. 2 to emphasize the communicative and power flow relationships between the module, the power supply, and the input and output voltages of the power supply.

Figure 3:
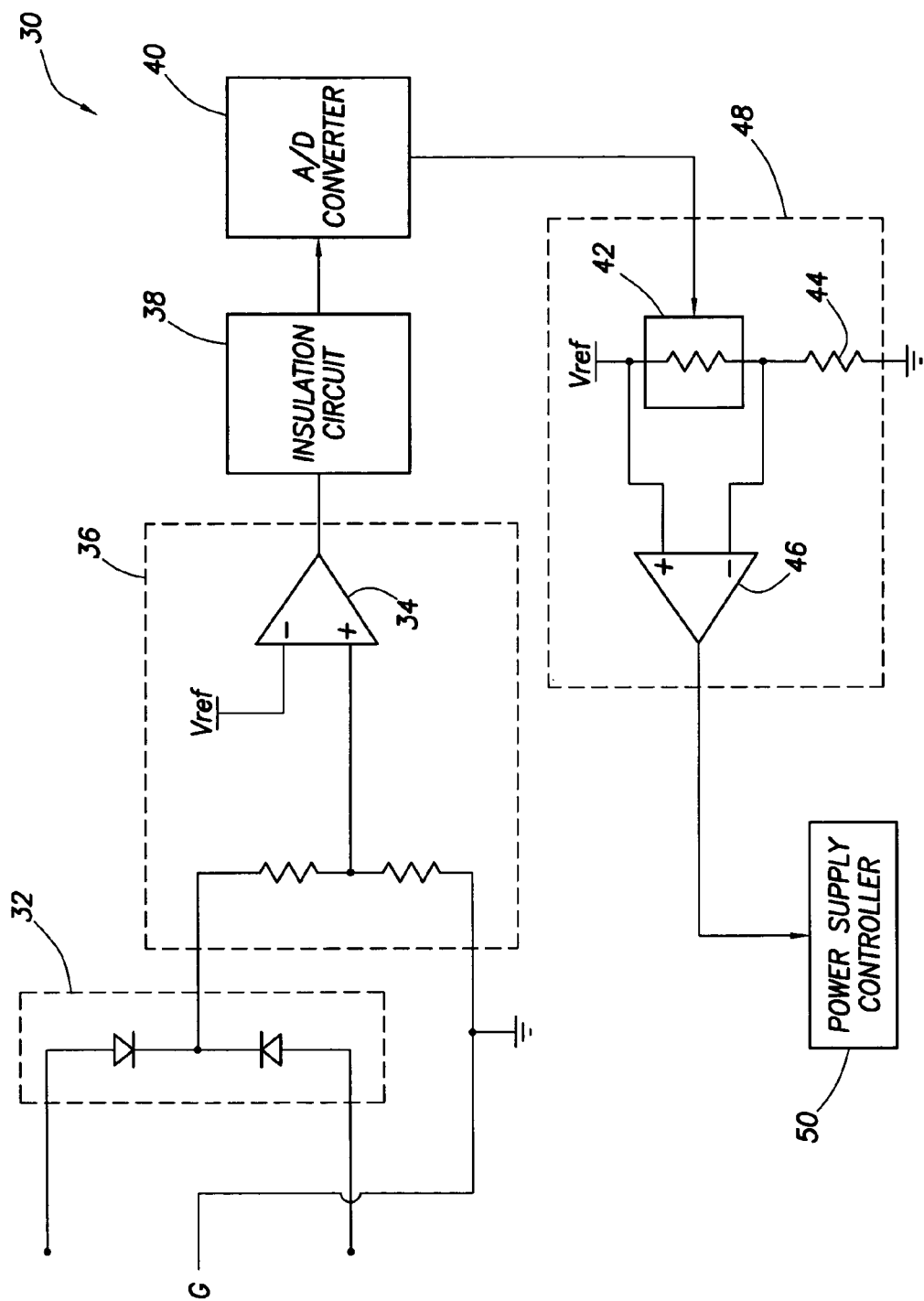
FIG. 3 is a circuit diagram of an overcurrent adjustment circuit.

Shown in FIG. 3 is a diagram of an overcurrent adjustment circuit, which is indicated generally at 30. At the input of the overcurrent adjustment circuit 30 is a rectifier 32, the output of which is provided to the non-inverting input of operational amplifier 34. Rectifier 32 converts the alternating current of the input voltage line into a direct current. The non-inverting input of the amplifier is coupled to a voltage potential $V_{ref}$. Amplifier 34 and the voltage divider inputs to the non-inverting input of amplifier 34 comprise a peak detection circuit 36. Amplifier 34 compares the inverting input to $V_{ref}$ to calculate an output signal that is a function of the difference between the rectified and divided input line voltage and $V_{ref}$, with the output of the amplifier being a signal representative of the input line voltage. The output signal from amplifier 34 is passed through an isolation circuit 38 and to an A/D converter 40. A/D converter 40 converts its analog input to a digital signal that is representative of the voltage level of the input voltage. The combination of rectifier 32, amplifier 36, isolation circuit 38, and converter 40 comprises a voltage identification module who output is a signal representative of the voltage level of the input line.

The digital output of A/D converter 40 is provided to a digital potentiometer or variable resistor 42. Potentiometer 42 provides an adjustable resistance value so that there is a predictable voltage drop across the resistance of potentiometer 42 as the voltage potential $V_{ref}$ is divided between the resistance of potentiometer 42 and resistor 44. The voltage drop across potentiometer 42 in the voltage divider that include resistor 44 results in a voltage potential being applied to the non-inverting input of operational amplifier 46. The voltage potential of $V_{ref}$ that is not dropped across potentiometer 42 is applied to the non-inverting input of amplifier 46. Amplifier provides an output signal that is a function of the difference between $V_{ref}$ and the reduced voltage level applied at the non-inverting input of amplifier 46. Thus, the output of converter 40 provides a digital signal that has the effect of causing amplifier 46 to provide an output signal that is representative of the value of the input line voltage to a reference voltage.

The output of amplifier 46 is the overcurrent set point, which is moved to a higher or lower setting depending on the voltage level of the input voltage. The potentiometer 42, resistor 44, and amplifier 46 comprise a current limit module, the output of which is a signal comprising the overcurrent set point. A higher voltage level at the input line results in a higher voltage level being output from amplifier 34, which in turn results in a higher resistance at potentiometer 42 and a higher output at the overcurrent set point output of amplifier 46. The overcurrent set point corresponds to the input voltage. A higher input voltage results in a higher overcurrent set point. A lower input voltage results in a lower overcurrent set point.

The output of amplifier 46 is provided to a power supply controller 50. The overcurrent set point establishes the overcurrent limit, which is monitored by power supply controller 50. The overcurrent limit is set as a maximum amperage allowable at the output of the power supply. The higher the input voltage level results in the overcurrent limit being set at a higher level. A higher input voltage level and a higher overcurrent limit results in a higher level of maximum power being available for supply by the power supply to the components of the information handling system. A lower input voltage level and a resulting lower overcurrent limit results in a lower level of maximum power being available for supply by the power supply to the components of the information handling system. When the overcurrent limit is reached, the power supply will turn itself off, thereby preventing the information handling system from drawing an excessive amount of current that may affect the safety limits of the input line.

The system and method disclosed herein results in the dynamic adjustment of the overcurrent set point of the power supply. The system and method disclosed herein may be used with or in power supplies in territorial regions having differing characteristics for input line voltage. The overcurrent adjustment circuit may be employed with every power supply to make certain that the power supply, regardless of the territorial region of its use, appropriately manages the current available to and drawn by the components of the associated handling system. When a higher input line voltage is present, the overcurrent set point can be adjusted higher, resulting in a higher level of potential power being available for delivery by the power supply to the information handling system. When a lower input line voltage is present, the overcurrent set point is adjusted lower, limiting the amount of amperage that may drawn by the components of the information handling system so that the power consumed by the information handling system is within the safety limits associated with the input line. The overcurrent set point can be dynamically adjusted in response to a change in the voltage characteristics of the input line. If, for example, the information handling system is moved to a region having a different set of voltage characteristics for an input line, the system and method disclosed herein will result in the dynamic adjustment of the overcurrent set point to accommodate the characteristics of the input line.

It should be recognized that the system and method described herein may be used in any information handling system and is not limited in its application to computer systems or server system. Rather, the system and method disclosed herein in any system that consumes power from a voltage line, regardless of the power delivery characteristics of the input line. Although the present disclosure has been described in detail, it should be understood that various changes, substitutions, and alterations can be made hereto without departing from the spirit and the scope of the invention as defined by the appended claims.

What is claimed is:

1. A system for adjusting the current limit of a power supply in relation to the voltage characteristics of an input line, comprising:
    a voltage identification module coupled to the input line, the voltage identification module providing an output signal representative of the voltage level of the input line, wherein the voltage identification module comprises a converter for converting the output of a peak detection circuit to a digital signal representative of the voltage level of the input line; and
    a current limit module that receives the output signal of the voltage identification module as an input and provides as an output a current limit signal that has a value that is related to the voltage characteristics of the input line.

2. The system for adjusting the current limit of a power supply of claim 1, wherein the voltage identification module comprises a peak detection circuit providing an output signal that is representative of the voltage level of the input line.

3. The system for adjusting the current limit of a power supply of claim 2, wherein the peak detection circuit comprises an amplifier whose output is a signal that is representative of the difference between a rectified voltage level from the input line and a reference voltage.

4. The system for adjusting the current limit of a power supply of claim 1, wherein the current limit module comprises:
    a variable resistor, the resistance value of which is set on the basis of the value of the output signal from the voltage identification module; and
    an amplifier that produces a current limit signal from a comparison to the difference between a reference voltage and a second voltage that is related to the reference voltage by the voltage drop across the variable resistor.

5. The system for adjusting the current limit of a power supply of claim 4, wherein the variable resistor comprises a digital potentiometer.

6. The system for adjusting the current limit of a power supply of claim 4, wherein the current limit signal is provided to a controller of the power supply.

7. A method for adjusting the current limit of a power supply, comprising the steps of:
    identifying the voltage level of the input line to the power supply, wherein the step of identifying the voltage level comprises,
        performing a rectification function on the input line;
        comparing the input line to a first reference voltage to produce a first intermediate signal representative of the voltage level of the input line; and
        converting the first intermediate signal from an analog signal to a digital signal; and
    establishing a current limit signal in relation to a maximum current limit associated with the voltage level of the input line.

8. The method for adjusting the current limit of a power supply of claim 7, further comprising the step of providing the current limit signal to a controller of the power supply.

9. The method for adjusting the current limit of a power supply of claim 6, wherein the step of establishing a current limit signal comprises the step of producing a current limit signal from a comparison of a second reference voltage and an intermediate voltage potential derived from applying a voltage drop across a variable resistor.

10. The method for adjusting the current limit in a power supply of claim 9, wherein the step of converting the intermediate value to a digital value representative of the voltage level of the input line comprises the steps of:
    converting the intermediate value from an analog signal to an intermediate digital value;
    setting the resistance level of a potentiometer in relation to the intermediate digital value; and
    producing the digital value by applying a voltage divider to the second reference voltage, wherein the resistance level of the potentiometer is used to produce a voltage drop in the voltage divider.

11. The method for adjusting the current limit in a power supply of claim 9, further comprising the step of providing the overcurrent set point signal to a controller of the power supply.

12. A method for adjusting the current limit in a power supply, comprising:
    identifying the voltage level of the input line to the power supply, wherein identifying the voltage level of the input line comprises,
        rectifying the input line voltage;
        comparing the rectified input line voltage to a first reference voltage; and
        producing an intermediate value that is representative of the voltage level of the input line;
    setting a current limit at the output of the power supply, wherein the current limit at the output of the power supply is set in relation to the voltage level of the input line to the power supply such that the current limit is set at a lower level when the voltage level of the input line is at a lower level, wherein the setting the current limit comprises setting an overcurrent set point on the basis of the intermediate value, and wherein setting an overcurrent set point comprises, converting the intermediate value to a digital value representative of the voltage level of the input line; and comparing the digital value to a second reference voltage to produce a signal comprising the overcurrent set point; and adjusting the current limit at the output of the power supply in response to a change in the voltage level of the input line to the power supply.

* * * * *